United States Patent [19]
Miranda

[11] Patent Number: 5,810,373
[45] Date of Patent: Sep. 22, 1998

[54] REMOVABLE STEPWISE ADJUSTABLE DOLLY SUPPORT ADJUSTABLE TO FIT VARIOUS DOLLIES

[76] Inventor: Eduardo E. Miranda, 91-593 Kuilioloa Pl., #Z-2, Ewa Beach, Hi. 96706

[21] Appl. No.: 587,289

[22] Filed: Jan. 16, 1996

[51] Int. Cl.⁶ .................................................. B62B 1/02
[52] U.S. Cl. ................... 280/47.2; 280/47.27; 280/654; 248/354.1
[58] Field of Search ................ 280/47.2, 47.27, 280/47.24, 641, 645, 654, 47.21; 248/354.1, 354.3, 354.5, 354.6

[56] References Cited

U.S. PATENT DOCUMENTS

| | | |
|---|---|---|
| 627,284 | 6/1899 | Walker . |
| 2,096,994 | 10/1937 | Millen .................................. 280/47.27 |
| 2,598,168 | 5/1952 | Hooz et al. . |
| 2,605,117 | 7/1952 | Hooz et al. . |
| 2,606,770 | 8/1952 | Reichert . |
| 2,612,386 | 9/1952 | Schutzer et al. . |
| 3,064,990 | 11/1962 | Salvucci . |
| 3,360,279 | 12/1967 | Hunt ........................................ 280/645 |
| 3,655,212 | 4/1972 | Krass et al. . |
| 4,284,286 | 8/1981 | Lewallen . |
| 4,630,837 | 12/1986 | Kazmark . |
| 4,681,330 | 7/1987 | Misawa ................................... 280/47.27 |
| 4,949,809 | 8/1990 | Levi et al. ............................ 248/354.1 |
| 5,160,153 | 11/1992 | Zan . |
| 5,207,439 | 5/1993 | Mortenson . |

FOREIGN PATENT DOCUMENTS

| | | | |
|---|---|---|---|
| 227953 | 5/1960 | Australia ................................ 280/641 |
| 202657 | 3/1983 | Taiwan . |
| 167015 | 8/1991 | Taiwan . |
| 199430 | 2/1993 | Taiwan . |

Primary Examiner—Brian L. Johnson
Assistant Examiner—Min Yu
Attorney, Agent, or Firm—Martin E. Hsia

[57] ABSTRACT

A retrofittable wheeled support for a dolly in which adjusting the length of the upper and lower frames adjusts the tilt angle at which the dolly is supported. Dolly ends of support tubes are detachably attachable to receivers that are mounted to the dolly frame so that the device can be easily removed or folded for storage. Dual wheel assemblies are provided for stability.

20 Claims, 7 Drawing Sheets

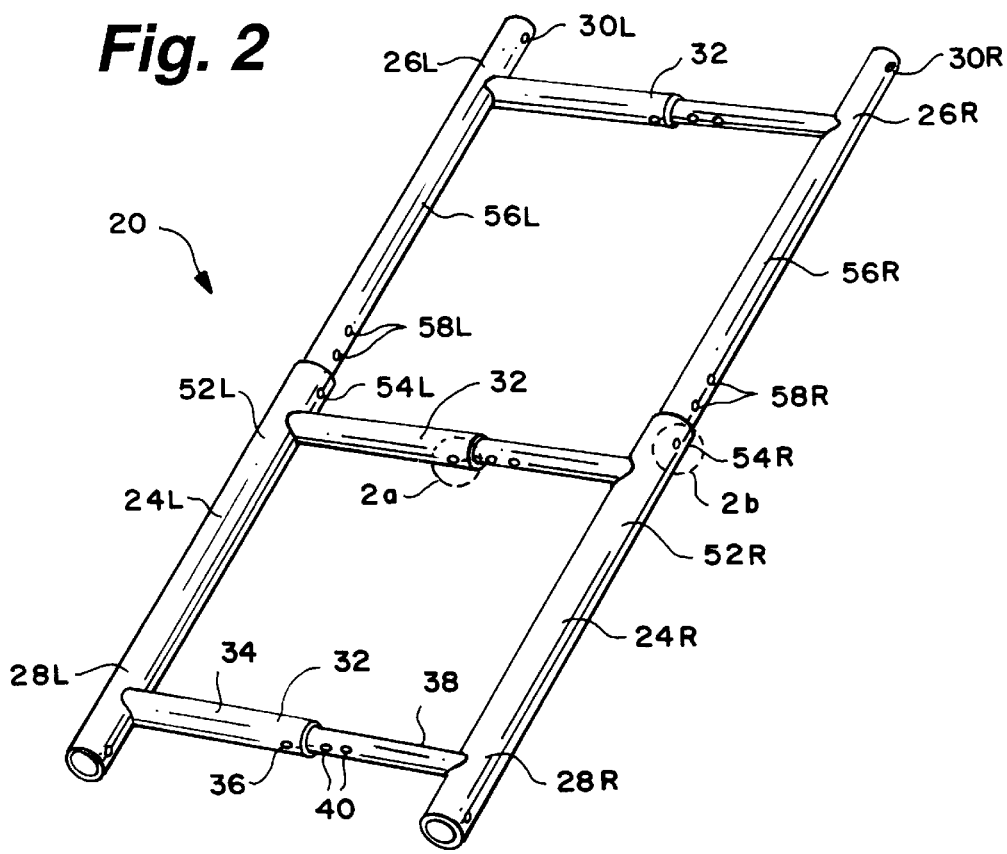
Fig. 2
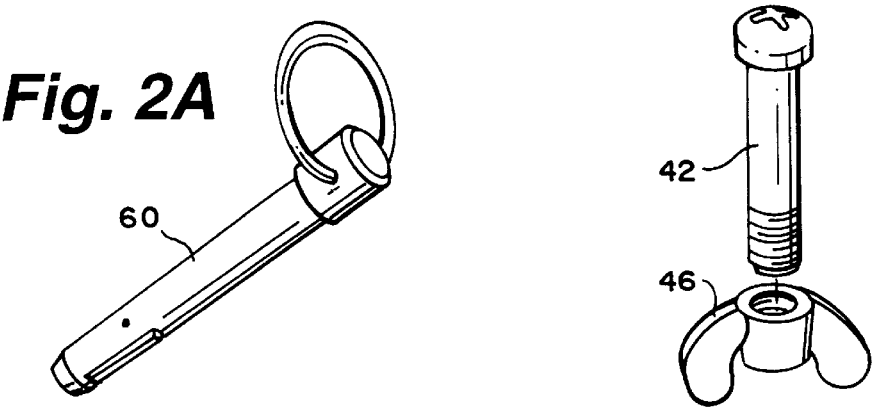
Fig. 2A
Fig. 2B

REMOVABLE STEPWISE ADJUSTABLE DOLLY SUPPORT ADJUSTABLE TO FIT VARIOUS DOLLIES

TECHNICAL FIELD

This invention relates to a retrofittable adjustable support for a dolly or hand truck.

The dolly, or hand truck, is widely used for moving goods, materials, and equipment. A conventional dolly comprises an elongated upper portion attached to an elongated lower portion having a lower end, with a blade projecting substantially perpendicularly forwardly from the lower portion at a blade level. The blade level is at least as low as the lower end, and two dolly wheels approximately tangential to the blade level support the lower portion. The dolly wheels are approximately coaxial and define a dolly wheel axis.

It is difficult to use a dolly carrying a maximum load because a dolly must be balanced on its wheels in order to raise its blade above the ground so that its wheels bear the weight of the load and the dolly can be maneuvered. Usually the blade is raised above the ground by tilting the dolly to a tilt angle. However, trying to balance a fully loaded dolly at a tilt angle so that the dolly and its load can be maneuvered places a tremendous stress on the arms and lower backs of a user.

Despite this problem, there are many dollies still in use that do not have any type of support for assisting users when moving a maximum load.

Although dollies are known that can be converted into wheeled carts by tilting the dolly to a tilt angle of approximately 90 degrees, such a load carrying dolly negates one of the principal advantages of using a dolly; the ability to load, move and maneuver goods, materials, and equipment while keeping them substantially upright, or at least without tilting them substantially more than approximately 45 degrees. Further, tilting the dolly to approximately 90 degrees before loading would require that the dolly be loaded manually, instead of using the blade.

A dolly support that allows a substantial tilt angle (say, more than about 15 degrees) is not preferred for moving or maneuvering heavy loads because the lifting force necessary to balance a heavily loaded dolly increases sinusoidally as the tilt angle increases. Thus, it is not preferred to use a tilt angle of approximately 15 degrees or greater for heavy loads because the lifting force required to balance the dolly then would be more than approximately one quarter of the weight of the load. Of course, if a heavily loaded dolly is substantially tilted and being supported by the user, there is the dangerous possibility that the dolly and its heavy load may tip over on the user and cause injury, or even death.

It is therefore an object of this invention to provide a support for a dolly that can easily be retrofitted onto existing standard dollies.

It is a further object of this invention to provide such a support that retains the ability of a standard dolly to move and maneuver goods, materials, and equipment without tilting them substantially more than 45 degrees.

It is a still further object of this invention to provide such a support that is widely adjustable through a range of tilt angles.

It is a still further object of the present invention to provide such a support that is economical and easy to manufacture.

It is a still further object of this invention to provide such a support that can be removed from a dolly when not in use, but can be quickly and easily reattached to the dolly when necessary.

It is a still further object of this invention to provide such a support that can be folded against the dolly when not in use, so as not to interfere with normal operation and use of the dolly, but that can be quickly and easily folded out and locked into position if and when needed, especially in the moving and maneuvering of large or heavy loads.

It is a still further object of the present invention to provide a support that prevents the dolly from exceeding any selected tilt angle so that the downward force exerted by the load on the user is limited.

It is a still further object of this invention to provide such a support that is approximately as wide as the dolly wheels for stability while maneuvering.

It is a still further object of the present invention to provide such a support that provides pivotable wheels for ease of maneuvering and stability.

BACKGROUND ART

U.S. Pat. No. 2,612,386 to Schutzer et al. discloses a wheeled attachment for hand trucks used to transport cylinders of compressed gas. The width of the support is not adjustable and is relatively narrow because the dolly itself is narrow to hold a single cylinder of compressed gas. Further, this attachment is not removable.

U.S. Pat. No. 3,655,212 to Krass, et al. discloses a self-supporting cart having crossbraces with a base frame carrying a front pair of laterally spaced roller means and a rear pair of laterally spaced roller means and a load receiving frame pivoted to the front-end portion of the base frame.

U.S. Pat. No. 4,630,837 to Kazmark discloses a two wheeled cart with an auxiliary wheel. However, this is not retrofittable to an existing dolly.

U.S. Pat. No. 2,606,770 to Reichert discloses a foldable wheel for hand trucks that is permanently attached. This device only has two positions —extended and retracted —and a locking means.

U.S. Pat. No. 4,284,286 to Lewallen discloses a combination hand truck and portable work table.

U.S. Pat. No. 627,284 to Walker discloses a hand truck having a single support wheel.

U.S. Pat. No. 2,598,168 to Hooz et al. discloses an additional wheel attachment for two wheel hand trucks.

U.S. Pat. No. 2,605,117 to Hooz et al. discloses a hand truck with a single rear wheel.

U.S. Pat. No. 3,064,990 to Salvucci discloses a hand truck with a single rear wheel that is permanently attached.

U.S. Pat. No. 5,160,153 to Zan discloses a barrow having high and low positioned wheels.

U.S. Pat. No. 5,207,439 to Mortenson discloses a pivotably connected spreadable wheel supported auxiliary support frame for hand trucks that is permanently attached.

DISCLOSURE OF INVENTION

The device of the present invention comprises:

an upper frame with right and left telescoping upper supports;

at least one transverse upper brace extending between the upper supports to maintain the distal ends of the upper supports in based apart relationship;

a lower frame having right and left telescoping lower supports;

at least one transverse lower brace to maintain the distal ends of the lower support in spaced apart relationship;

so that the distal ends of the upper supports and the distal ends of corresponding lower supports are angularly adjustably retained to pivot with respect to each other about a transverse support wheel axis parallel to the dolly wheel axis;

right and left support wheel assemblies pivotably attached at corresponding ends of the support wheel axis to pivot perpendicularly to the support wheel axis;

upper receivers movable along the upper portion of the dolly and adapted to angularly adjustably receive dolly ends of the upper supports; and lower receivers movable along the lower portion of the dolly and adapted to angularly adjustably receive the dolly ends of the lower supports.

The dolly wheel axis and the support wheel axis define a dolly wheelbase, and the dolly can be tilted to a tilt angle to cause the dolly wheel and support wheels to simultaneously contact the ground and support the dolly at the tilt angle.

Telescoping and retracting the upper supports and lower supports adjusts the wheelbase and the tilt angle. Preferably, the support wheel assemblies each comprise two independently swivelable spaced apart wheels. Preferably, also, the receivers are removably mounted on the dolly.

Preferably each of the dual wheel assemblies comprises a first wheel pivotably mounted in an upper support and a second wheel pivotably mounted in a lower support and a connecting rod pivotably joining the upper and lower support, but with the wheels having independent axles. With this construction, double wheels can be provided at laterally spaced apart portions of the device, yet the wheels are strong because of the simple construction, and the support remains adjustable throughout a wide range of tilt angles.

Preferably, for strength and lightness, the upper and lower supports comprise hollow tubes.

Other objects, features, and advantages of the present invention will become more fully apparent from the following detailed description of the presently preferred embodiment for carrying out the invention, the claims, and the accompanying drawings.

BRIEF DESCRIPTION OF THE DRAWINGS

FIG. 2 is a perspective view of the upper frame of the embodiment of FIG. 1;

FIG. 2 (*a*) is a perspective view of a locking key for use with the embodiment of FIG. 1;

FIG. 2 (*b*) is a perspective view of a locking bolt for use with the embodiment of FIG. 1;

FIG. 3 (*a*) is a perspective view of a locking key for use with the embodiment of FIG. 1;

FIG. 3 (*b*) is a perspective view of a locking bolt for use with the embodiment of FIG. 1;

FIG. 4 (*b*) is a perspective view of the receiver and connector of FIG. 4 (*a*) used to connect the device to a dolly with a round frame;

FIG. 8 (*b*) is a perspective view of the receiver of FIG. 8 (*a*) used to connect the device to a dolly with a square frame.

BEST MODE FOR CARRYING OUT INVENTION

The best mode presently contemplated for carrying out the present invention is the preferred embodiment illustrated by way of example in FIGS. 1–8 (*b*).

Figure 1:
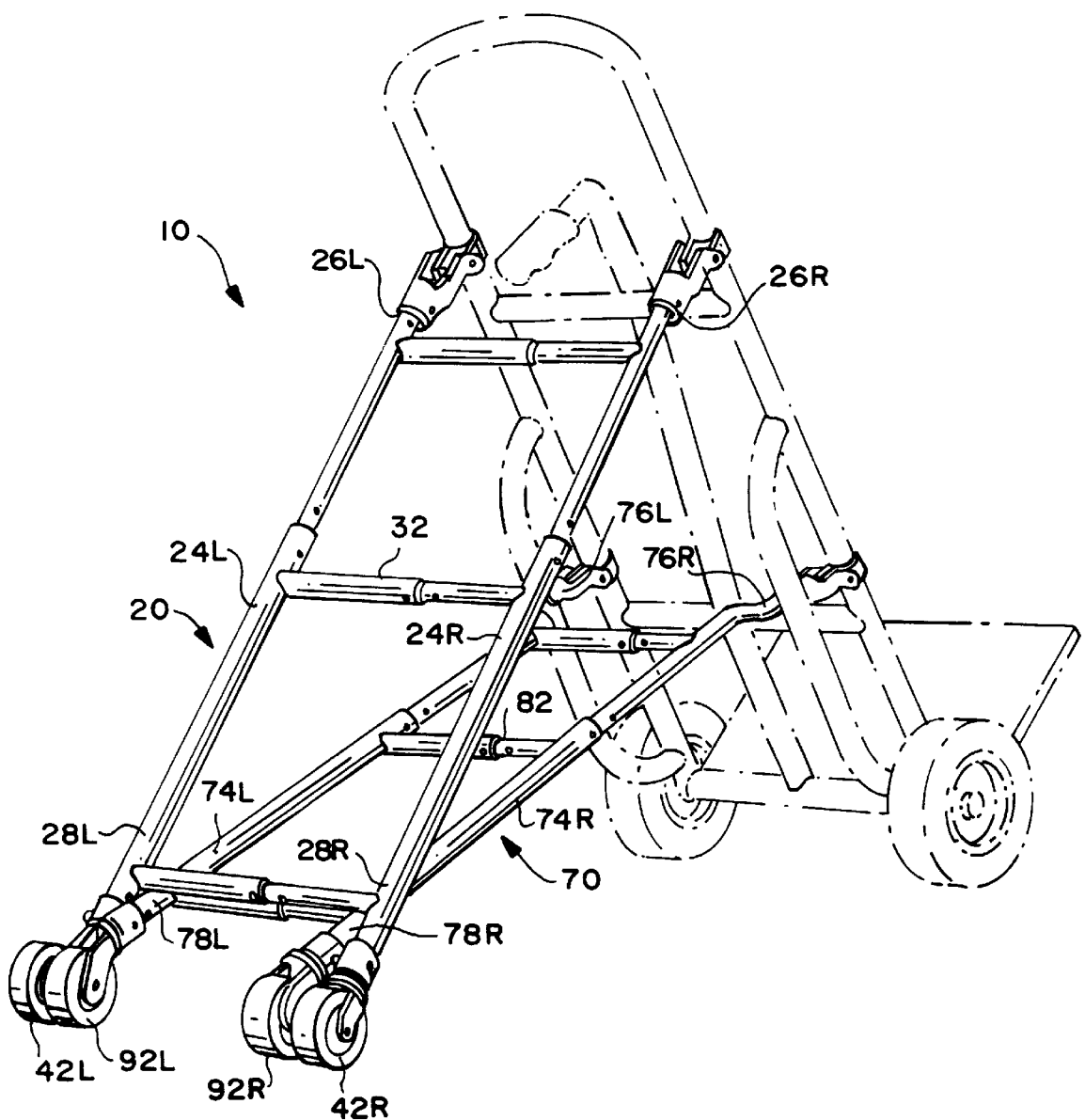
FIG. 1 is a perspective view of the presently preferred embodiment of this invention with the dotted lines showing environmental structure only.

Referring to FIG. 1, shown is a perspective view of the presently preferred embodiment 10 of the present invention, with the dotted line showing environmental structure only and forming no part of the invention. The presently preferred embodiment comprises an upper frame 20 and a lower frame 70. The upper frame 20 comprises right and left telescoping upper supports 24L and 24R. Each of the upper supports has a dolly end 26L and 26R and a distal end 28L and 28R. Preferably at least one, and optimally three, transverse upper braces 32 extend between the upper supports 24L and 24R, and maintain the distal ends 28L and 28R in spaced apart relationship, optimally so that the upper supports 24L and 24R are approximately parallel to each other. The lower frame 70 preferably comprises left and right lower supports 74L and 74R with dolly ends 76L and 76R and distal ends 78L and 78R. At least one, and preferably three, transverse lower braces 82 extend between the lower supports 74L and 74R to maintain the distal ends 78L and 78R in spaced apart relationship, optimally so that the lower supports 74L and 74R are approximately parallel to each other.

The distal ends 28L and 28R of the upper supports 24L and 24R and the distal ends 78L and 78R of the corresponding lower supports 74L and 74R are preferably angularly adjustably retained to pivot with respect to each other about a transverse elongated support wheel axis approximately parallel to the dolly wheel axis. The dolly wheel axis and the support wheel axis define a dolly wheelbase.

Preferably left and right upper wheels 42L and 42R are pivotably mounted near the distal ends 28L and 28R of the upper supports 24L and 24R. Preferably also, left and right lower wheels 92L and 92R are pivotably mounted near the distal ends 78L and 78R of the lower supports 74L and 74R.

Referring to FIG. 2, shown is the upper frame of the embodiment of FIG. 1. Connector apertures 30L and 30R are preferably provided near the dolly ends 26L and 26R. Preferably the left and right upper supports 24L and 24R comprise outer tubes 52L and 52R, each with a single outer locking aperture 54L and 54R, and inner tubes 56L and 56R, each with a plurality of adjustment apertures 58L and 58R, preferably spaced approximately one inch apart. The inner tubes 56L and 56R therefore can slide coaxially in and out of the outer tubes 52L and 52R and the locking hole 54L and 54R can become aligned with a selected adjustment aperture 58L and 58R. When the outer tubes 52L and 52R and the inner tubes 56L and 56R are so aligned, locking keys 60 (see FIG. 2 (*a*)) can be inserted through the aligned locking holes 54L and 54R and adjustment apertures 58L and 58R. Thus, the upper supports 24L and 24R can telescope (or contract) in length and be locked at selected lengths by inserting the locking keys 60.

Similarly, the transverse braces 32 preferably comprise outer tubes 34, each having a single locking aperture 36, and inner tubes 38, each having a plurality of adjustment apertures 40, so that the inner tubes 38 can slide coaxially in and out of the outer tubes 34. The outer tubes 34 and inner tubes 38 of the transverse braces 32 are preferably permanently attached to the upper supports 24L and 24R. Thus, sliding the inner tube 38 coaxially with respect to the outer tube 34 adjusts the length of the transverse brace 32 and therefore the separation between the upper supports 24L and 24R. When a selected separation between the upper supports 24L and 24R is reached, a locking bolt 42 (see FIG. 2 (b)) can be inserted through aligned locking apertures 36 and adjustment apertures 40 and secured in place by a butterfly nut 46.

Figure 3:
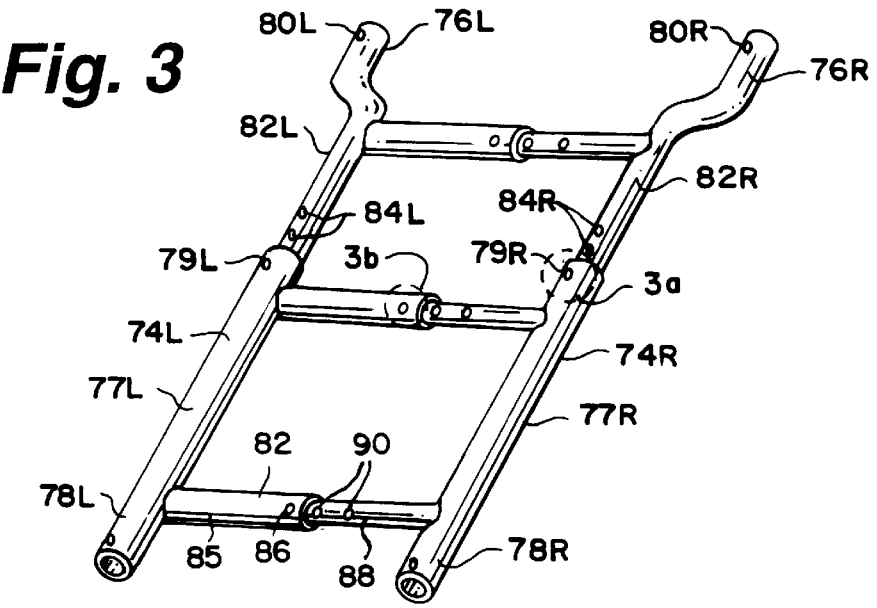
FIG. 3 is a perspective view of the lower frame of the embodiment of FIG. 1.
Figure 3A:
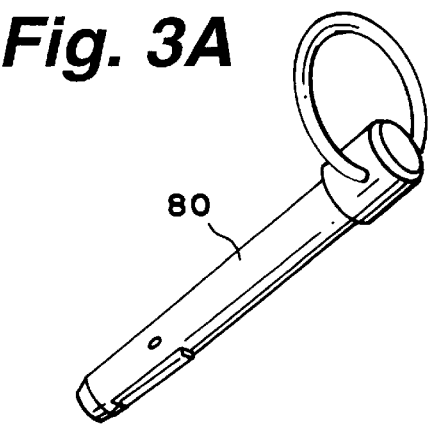
Figure 3B:
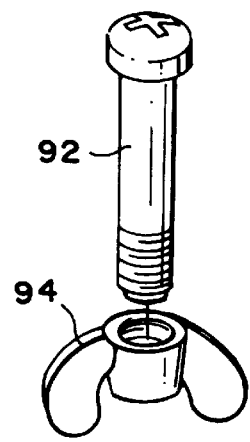

Referring to FIG. 3, shown is a perspective view of the lower frame of the present invention in which the lower supports 74L and 74R similarly comprise outer tubes 77L and 77R, each having a single locking aperture 79L and 79R, with inner tubes 82L and 82R having a plurality of adjustment apertures 84L and 84R (preferably spaced at least approximately one inch apart) so that the lower supports can be telescoped and locked at selected lengths by a locking key 80 (see FIG. 3 (a)). The transverse lower braces 82 similarly comprise outer tubes 85, each having a single locking aperture 86, and inner tubes 88, each having a plurality of adjustment apertures 90. The inner tubes 88 and the outer tubes 85 are attached to the lower supports 74L and 74R so that sliding the inner tube 88 coaxially with respect to the outer tube 85 adjusts the separation between the lower supports 74L and 74R. When the locking aperture 86 aligns with a selected adjustment aperture 90, a locking bolt 92 (see FIG. 3 (b)) can be inserted and retained in place by a butterfly nut 94. Connecting apertures 80L and 80R are provided near the dolly ends of the lower frames.

Figure 4A:
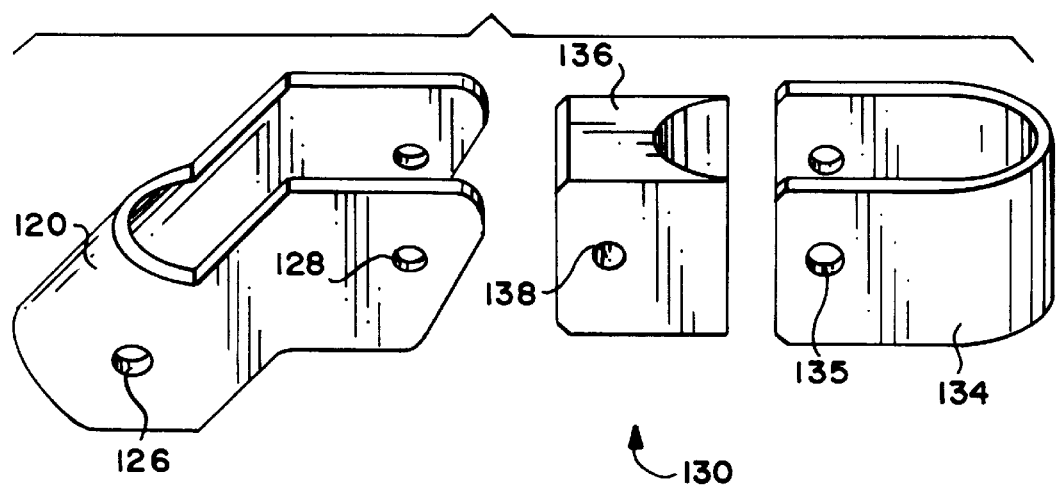
FIG. 4 (*a*) is a an exploded perspective view of a receiver and a connector for dollies with a round frame.
Figure 4B:
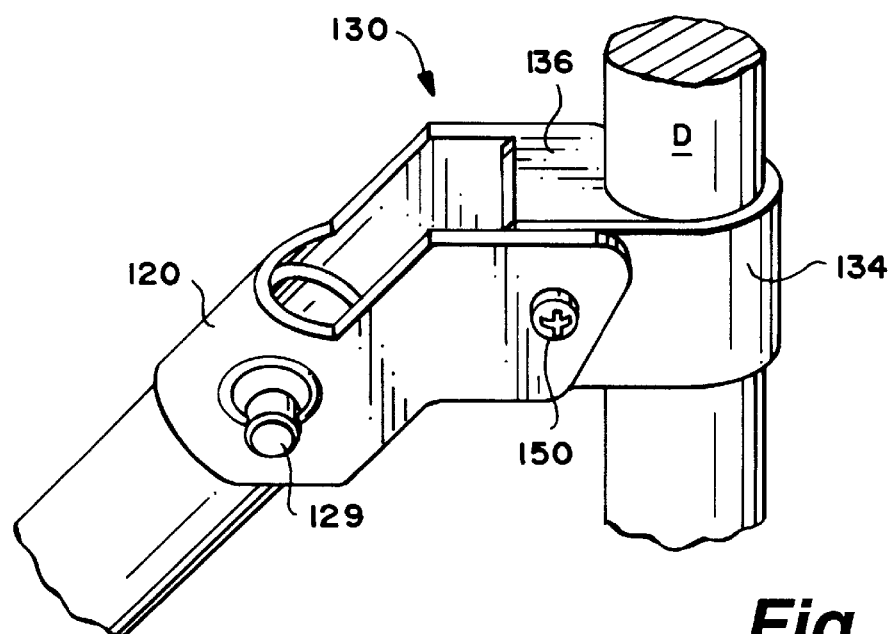

Referring to FIG. 4 (a), shown is a presently preferred embodiment of a connector 120 and a receiver assembly 130 that attach the upper or lower frames 20, 70, of the present embodiment 10 on a dolly having a frame made of tubing with a round cross section (not shown). A connector 120 that can fit over the dolly ends 26L, 26R, 76L or 76R is provided with a retaining aperture 126 that can align with the connector apertures 30L, 30R, 80L or 80R. A collar aperture 128 is also provided.

The receiver assembly 130 comprises a U-shaped band 134 (configured to wrap around a portion of the dolly's frame) having a band aperture 135 and a band holder 136 having a holder aperture 138 that can be fit inside the band 134.

Referring to FIG. 4 (b), the receiver assembly 130 can be secured to a selected portion of the dolly's frame D by wrapping the band 134 around the dolly frame D, and fitting the holder 136 inside the band 134. The connector 120 then can be fit over the holder 136 and the band 134 so that the collar aperture 128, the holder aperture 138 and the band aperture 135 all align with each other, and a bolt 150 can be inserted through the aligned apertures and secured in place by a nut (not shown). This structure attaches the connector 120 to the dolly frame D and allows the connector 120 to be angularly adjustable with respect to the dolly frame D. A dolly end 26L, 26R, 76L or 76R then can be inserted into the connector 120, so that a connector aperture 30L, 30R, 80L, 8OR aligns with the retaining aperture 126, and a retaining key 129 can be inserted in order to connect the connector 120 to a dolly end 26L, 26R, 76L, 76R.

Figure 5:
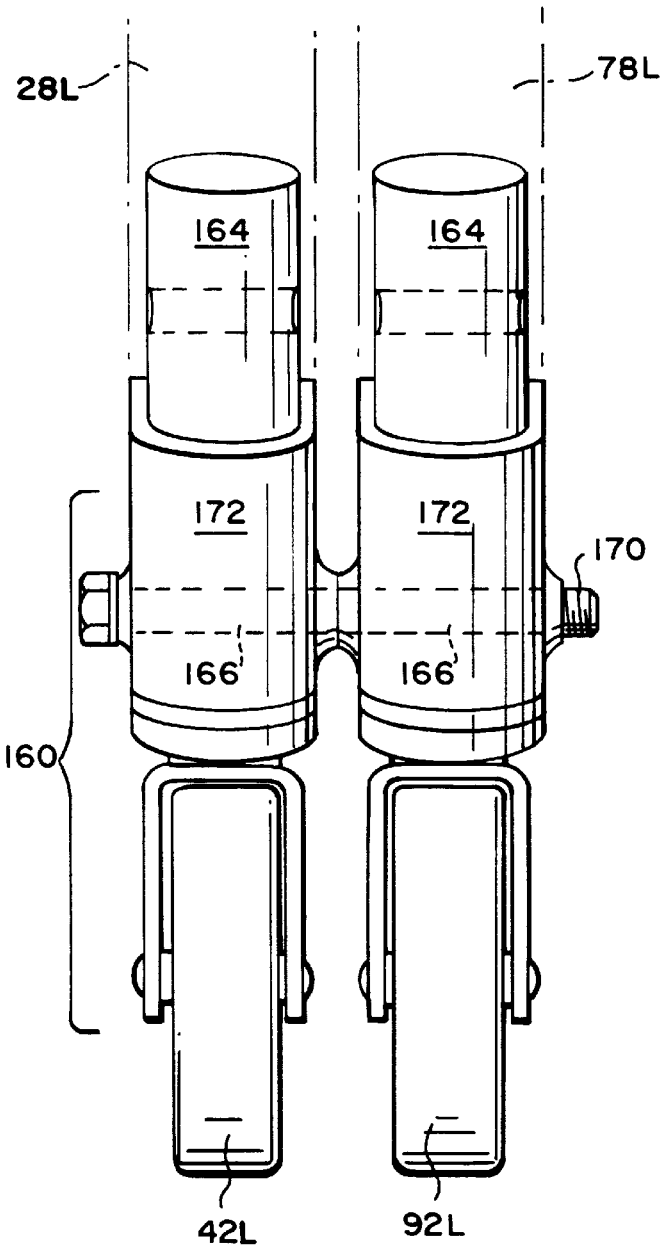
FIG. 5 is a front elevational view of the left wheel assembly of the embodiment of FIG. 1, the right wheel assembly being a mirror image thereof.

Referring to FIG. 5, shown is a front elevational view of a left wheel assembly according to the present invention. As can be seen, two wheel tubes 164 configured to be received inside the distal ends 28L, 78L of the left upper support and left lower support, respectively, are provided with support axis apertures 166. A support axle 170 is threaded through the support axis apertures 166 so that the wheel tubes 164 can pivot with respect to each other in parallel spaced apart planes. Thus, the left upper support 24L and the left lower support 74L are joined near their distal ends 28L, 78L to pivot with respect to each other about a transverse support wheel axis 166. The left upper wheel 42L and the left lower wheel 92L are then mounted on the wheel rods 164 preferably so that they can swivel about an axis coaxial with the distal ends of the support tubes to which they are attached. Of course, the wheels 42L and 92L also can roll.

Figure 6:
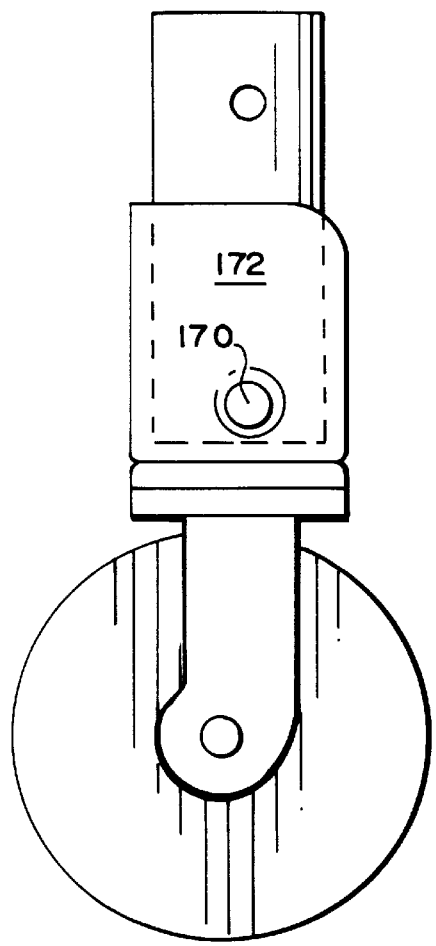
FIG. 6 is a side elevational view of the wheel assembly shown in FIG. 5.

Referring to FIG. 6, shown is a side elevational view of the wheel assembly of FIG. 5. It is presently preferred to provide an additional wheel support 172 that can provide reinforcement for the support axle 170.

Figure 7:
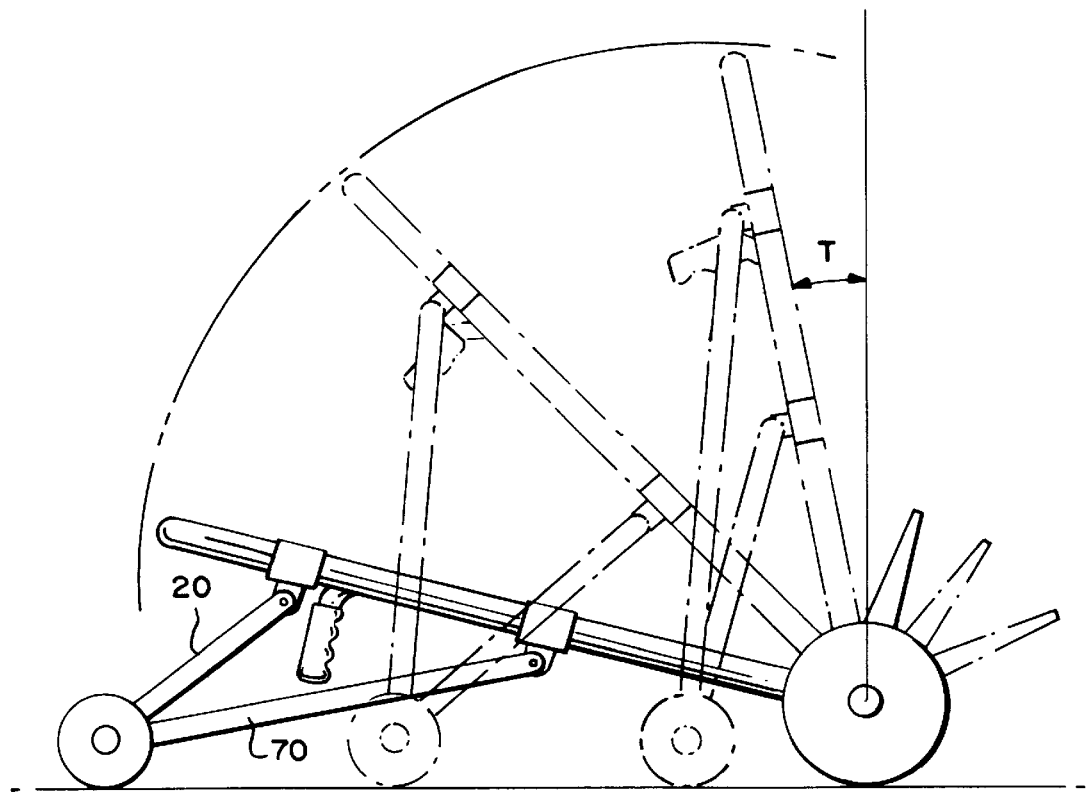
FIG. 7 is a side elevational view of the embodiment of FIG. 1 showing the range of tilt angles that can be supported.

Referring to FIG. 7, shown is a side elevational view of the embodiment of FIG. 1, showing a portion of the range of tilt angles that can be achieved by varying the lengths of the supports 20, 70. As can be seen, by shortening the upper supports 20 as much as possible and lengthening the lower support 70 as much as possible, the tilt angle T can be made as great as approximately 90°. Yet, by lengthening the upper support 20 and shortening the lower support 70, the tilt angle T can be adjusted to less than 15°.

Because the objective of this invention is to allow a dolly to carry large or heavy loads and because continuously variable telescoping tubes are not dependable, it is preferred to provide telescoping tubes having selectable multiple fixed lengths, so that the tube lengths are stepwise adjustable, which allows the tilt angles to be stepwise adjustable. It is further preferred that such lengths allow tilt angles in increments of approximately 1° or 2° for smaller tilt angles, and larger increments for larger tilt angles. This is because the smaller tilt angles will be used for heavier loads so that finer adjustment of tilt angles will be necessary in order to properly balance a dolly using the present support, but larger tilt angles will probably be used for lighter loads. Smaller tilt angles will be used for larger loads to reduce the strain of the user who must support the dolly until it has been tilted to the tilt angle at which the support wheels will support the load.

Figure 8A:
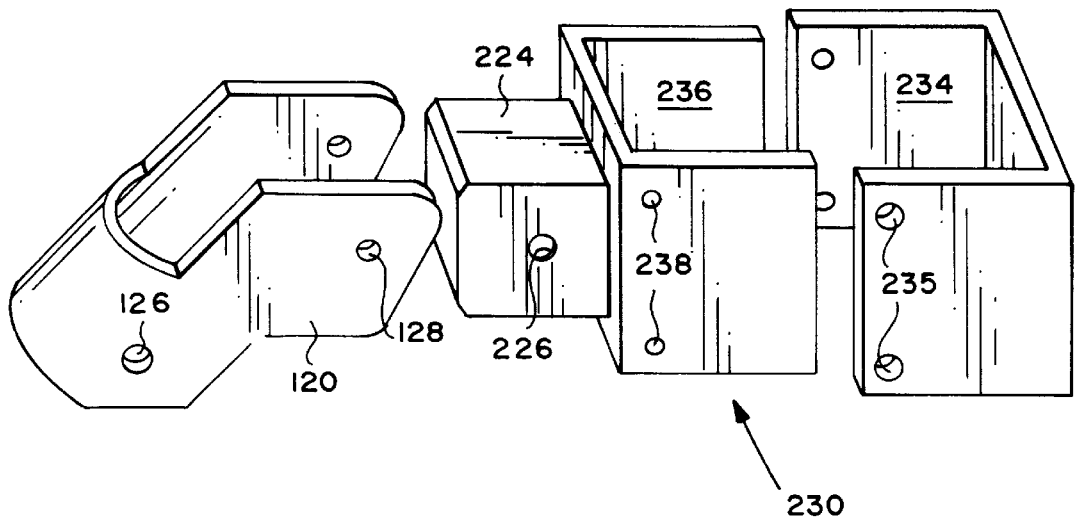
FIG. 8 (*a*) is an exploded perspective view of a receiver for a dolly with a square frame.
Figure 8B:
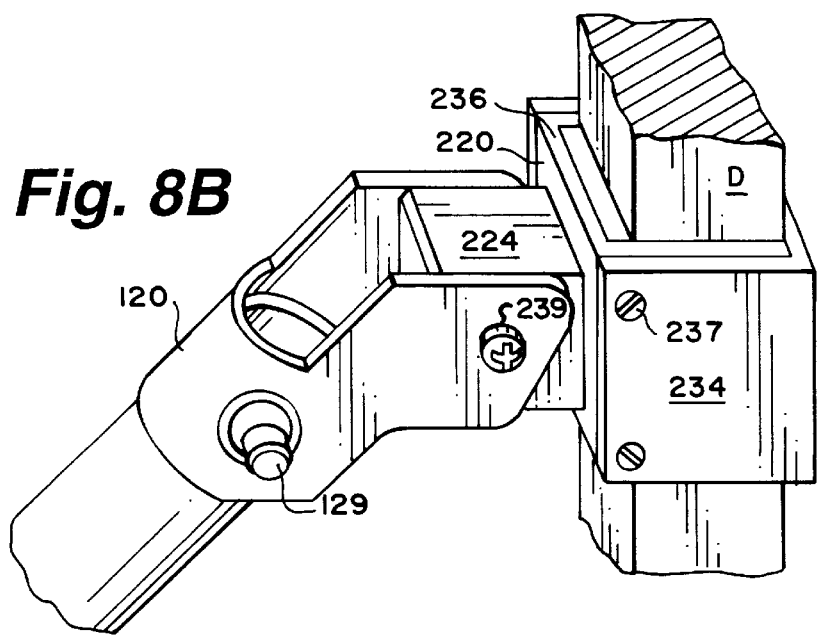

Referring to FIG. 8 (a), shown is a presently preferred embodiment of a receiver assembly 230 that can attach the upper or lower frames 20, 70, of the present embodiment 10 on a dolly having a frame made of tubing with a square cross section (not shown) using a connector similar to the connector 120 shown in FIGS. 4 (a) and 4 (b). The connector 120 similarly can fit over the dolly ends 26L, 26R, 76L or 76R and is similarly provided with a retaining aperture 126 that can align with the connector apertures 30L, 30R, 80L or 80R. A collar aperture 128 is also provided.

The receiver assembly 230 comprises a band 234 (configured to wrap around a portion of the dolly's frame) having band apertures 235 and a band holder 236 having holder apertures 238 that can be fit inside the band 234.

Referring to FIG. 8 (b), the receiver assembly 230 can be secured to a selected portion of the dolly's frame D by wrapping the band 234 around the dolly frame D, and fitting the holder 236 inside the band 234 until the band apertures 235 and the holder apertures 238 are aligned. The band 234 and holder are then screwed together using screws 237. The connector 120 then can be fit over the projection 224 on the holder 236 so that the projection aperture 226 and the holder aperture 128 align with each other, and a bolt 239. A dolly end 26L, 26R, 76L or 76R then can be inserted into the connector 120, so that a connector aperture 30L, 30R, 80L, 8OR aligns with the retaining aperture 126, and a retaining key 129 can be inserted in order to connect the connector 120 to a dolly end 26L, 26R, 76L, 76R. This structure attaches the connector 120 to the dolly frame D and allows the connector 120 to be angularly adjustable with respect to the dolly frame D.

In use, a user can select lengths of the upper and lower supports so that the wheels will support the dolly at a selected tilt angle. The user then can insert the blade of the dolly under the load in the conventional manner, and then tilt the dolly and the load until the support wheels support the load. The use of wheel assemblies with double wheels is preferred because the double wheels are believed to be more stable than single wheels would be. However, the present invention can also be practiced with single wheels.

If it is not desired to use the present device, the retaining keys 129 can be removed so that the upper and lower frames are detached from the dolly, although the receivers will remain attached. Thus, the device can be readily reattached to the dolly if desired. Further, the receivers are angularly adjustable to accommodate the different angles that the support will form with the dolly at different tilt angles.

If it is desired to fold away the device but still to retain the device attached to the dolly for ready availability, only the dolly ends of one of the frames can be detached from their corresponding receivers so that the entire device can be folded to be parallel to the frame of the dolly. The device then can be tied or otherwise secured to the frame of the dolly to remain conveniently out of the way.

The ability to adjust the tilt angle by adjusting the lengths of the supports also is useful if the dolly must be used for transporting loads uphill or downhill.

While the present invention has been disclosed in connection with the presently preferred embodiment described herein, it should be understood that there may be other embodiments which fall within the spirit and scope of the invention, as defined by the claims. For example, the supports and cross members can be made to contract or telescope in any alternative manner. For another example, the manner by which the upper and lower frames pivot with respect to each other, or the wheels are attached, are not critical, and any alternatives can be used. Similarly, different types of connectors and receivers for attaching the device to a dolly can be used. Accordingly, no limitations are to be implied or inferred in the scope of the invention except as specifically and explicitly set forth in the attached claims.

INDUSTRIAL APPLICABILITY

This invention can be used as a support for all dollies, regardless of width or type of frame.

What is claimed is:

1. A device for a dolly, said dolly having an elongated upper portion attached to an elongated lower portion having a lower end, a blade projecting substantially perpendicularly forwardly from said lower portion at a blade level at least as low as said lower end, and two dolly wheels approximately tangential to said blade level supporting said lower portion, said dolly wheels being approximately coaxial and defining a dolly wheel axis, comprising:

an upper frame having right and left telescoping upper supports, each of said upper supports having a dolly end and a distal end;

at least one transverse upper brace extending between said upper supports, whereby said upper brace maintains said distal ends of said upper supports in spaced apart relationship;

a lower frame having right and left telescoping lower supports, each of said lower supports having a dolly end and a distal end;

at least one transverse lower brace extending between said lower supports, whereby said lower brace maintains said distal ends of said lower supports in spaced apart relationship;

wherein said distal ends of said upper supports and said distal ends of corresponding ones of said lower supports are angularly adjustably retained to pivot with respect to each other about a transverse elongated support wheel axis, said distal ends defining a right end and a left end of said support wheel axis and a support wheel axis length, wherein said support wheel axis is approximately parallel to said dolly wheel axis;

right and left support wheel assemblies, each pivotably attached to said distal end of a corresponding support near a corresponding end of said support wheel axis to pivot in a plane that is perpendicular to said support wheel axis;

upper receivers adapted to be attached to and movable along said upper portion of said dolly and adapted to angularly adjustably receive said dolly ends of said upper supports;

lower receivers adapted to be attached to and movable along said lower portion of said dolly and adapted to angularly adjustably receive said dolly ends of said lower supports;

whereby when said dolly ends of said supports are received in corresponding receivers, said supports can be telescoped and retracted to selected lengths so that said dolly can be tilted to a selected tilt angle at which said dolly wheel assemblies and said support wheels simultaneously contact the ground and support said dolly at said selected tilt angle;

whereby adjusting said lengths of said supports adjusts said tilt angle.

2. A device according to claim 1, wherein said telescoping supports are stepwise adjustable.

3. A device according to claim 1, wherein said support wheel assemblies each comprise two spaced apart wheels.

4. A device according to claim 1, wherein said transverse supports are telescoping transverse supports, whereby said support wheel axis length can be adjusted by telescoping said transverse supports.

5. A device according to claim 1, wherein said upper receivers are removably mounted on said upper portion of said dolly, and said lower receivers are removably mounted on said lower portion of said dolly.

6. A device according to claim 1, wherein said supports and braces comprise hollow tubes.

7. A device according to claim 1, wherein said telescoping upper supports and said telescoping lower supports comprise locking devices to lock said supports at selected fixed lengths.

8. A device according to claim 6, wherein each of said supports comprises inner and outer elongated coaxial hollow tubes, one of said tubes having at least one locking hole and the other of said tubes having a plurality of adjustment holes, wherein said locking device comprises a removable pin insertable through one of said adjustment holes and said locking hole.

9. A device according to claim 7, wherein said adjustment holes are spaced at least approximately one inch apart.

10. A device according to claim 1, wherein said supports and braces comprise metal.

11. A device according to claim 1, wherein said distal ends of said lower support members are removable from said lower receiving devices, whereby said lower frame can be folded against said upper frame and said upper frame can be folded against said dolly.

12. A device according to claim 1, wherein said selected tilt angle can be between 0 and 90 degrees.

13. A device according to claim 1, wherein said selected tilt angle can be between approximately 0 and approximately 5 degrees.

14. A device according to claim 1, wherein said selected tilt angle can be between approximately 0 and approximately 3 degrees.

15. A device according to claim 1 wherein said selected tilt angle can be between approximately 0 and approximately 45 degrees.

16. A device according to claim 1, wherein said tilt angle can be between approximately 0 and approximately 30 degrees.

17. A device according to claim 1, wherein said selected tilt angle can be adjusted in increments of between approximately one and two degrees between tilt angles of approximately 0 and approximately 30 degrees, and greater increments at tilt angles greater than approximately 30 degrees.

18. A device for a dolly, said dolly having an elongated upper portion attached to an elongated lower portion having a lower end, a blade projecting substantially perpendicularly forwardly from said lower portion at a blade level at least as low as said lower end, and two dolly wheels approximately tangential to said blade level supporting said lower portion, said dolly wheels being approximately coaxial and defining a dolly wheel axis, comprising:

an upper frame having right and left telescoping upper supports, each of said upper supports having a dolly end and a distal end;

two parallel transverse upper braces extending between said upper supports, whereby said upper braces maintain said distal ends of said upper supports in spaced apart relationship;

a lower frame having right and left telescoping lower supports, each of said lower supports having a dolly end and a distal end;

two parallel transverse lower braces extending between said lower supports, whereby said lower braces maintain said distal ends of said lower supports in spaced apart relationship;

wherein said distal ends of said upper supports and said distal ends of corresponding ones of said lower supports are angularly adjustably retained to pivot with respect to each other about a transverse support wheel axis having a right end and a left end, wherein said support wheel axis is approximately parallel to said dolly wheel axis;

right and left upper support wheels, each pivotably attached to said distal end of a corresponding upper support to pivot in a plane that is perpendicular to said support wheel axis;

right and left lower support wheels, each pivotably attached to said distal end of a corresponding lower support to pivot in a plane that is perpendicular to said support wheel axis;

upper receivers adapted to be attached to and movable along said upper portion of said dolly removably mounted on said upper portion and adapted to angularly adjustably lockably receive said dolly ends of said upper supports;

lower receivers adapted to be attached to and movable along said lower portion of said dolly removably mounted on said lower portion and adapted to angularly adjustably lockably receive said dolly ends of said lower supports;

whereby when said dolly ends of said supports are received in corresponding receivers, said dolly can be tilted to a tilt angle that causes said dolly wheels and said support wheels to simultaneously contact the ground and to support said dolly at said tilt angle;

whereby telescoping and retracting said upper supports of said upper frame and said lower supports of said lower frame adjusts said tilt angle;

wherein said tilt angle is between approximately 0 and approximately 90 degrees.

19. A device according to claim 18, wherein said support wheels define a support wheel axis length, wherein said dolly wheels define a dolly axis length, and wherein said support wheel axis length is approximately equal to said dolly axis length.

20. An apparatus, comprising:

a dolly having an elongated upper portion attached to an elongated lower portion having a lower end;

a blade projecting substantially perpendicularly forwardly from said lower portion at a blade level at least as low as said lower end;

two dolly wheels approximately tangential to said blade level supporting said lower portion, said dolly wheels being approximately coaxial and defining a dolly wheel axis;

an upper frame having right and left telescoping upper supports, each of said upper supports having a dolly end and a distal end;

at least one transverse upper brace extending between said upper supports, whereby said upper brace maintains said distal ends of said upper supports in spaced apart relationship;

a lower frame having right and left telescoping lower supports, each of said lower supports having a dolly end and a distal end;

at least one transverse lower brace extending between said lower supports, whereby said lower brace maintains said distal ends of said lower supports in spaced apart relationship;

wherein said distal ends of said upper supports and said distal ends of corresponding ones of said lower supports are angularly adjustably retained to pivot with respect to each other about a transverse elongated support wheel axis, said distal ends defining a right end and a left end of said support wheel axis and a support wheel axis length, wherein said support wheel axis is approximately parallel to said dolly wheel axis;

right and left support wheel assemblies, each pivotably attached to said distal end of a corresponding support near a corresponding end of said support wheel axis to pivot in a plane that is perpendicular to said support wheel axis;

upper receivers adapted to be attached to and movable along said upper portion of said dolly and adapted to angularly adjustably receive said dolly ends of said upper supports;

lower receivers adapted to be attached to and movable along said lower portion of said dolly and adapted to angularly adjustably receive said dolly ends of said lower supports;

whereby when said dolly ends of said supports are received in corresponding receivers, said supports can be telescoped and retracted to selected lengths so that said dolly can be tilted to a selected tilt angle at which said dolly wheel assemblies and said support wheels simultaneously contact the ground and support said dolly at said selected tilt angle;

whereby adjusting said lengths of said supports adjusts said tilt angle.

* * * * *